US009791059B2

(12) United States Patent
Amadini et al.

(10) Patent No.: US 9,791,059 B2
(45) Date of Patent: Oct. 17, 2017

(54) VENT VALVE FOR GAS PRESSURE REGULATORS AND PRESSURE REGULATOR EQUIPPED WITH SAID VENT VALVE

(71) Applicant: PIETRO FIORENTINI S.P.A., Arcugnano (VI) (IT)

(72) Inventors: Armando Amadini, Castel Mella (IT); Paolo Calciolari, Lonigo (IT)

(73) Assignee: Pietro Fiorentini S.P.A., Arcugnano (VI) (IT)

( * ) Notice: Subject to any disclaimer, the term of this patent is extended or adjusted under 35 U.S.C. 154(b) by 0 days.

(21) Appl. No.: 15/002,222

(22) Filed: Jan. 20, 2016

(65) Prior Publication Data

US 2016/0208941 A1    Jul. 21, 2016

(30) Foreign Application Priority Data

Jan. 21, 2015   (IT) ............... VI2015A0016

(51) Int. Cl.

| F16K 31/12 | (2006.01) |
| F16K 17/40 | (2006.01) |
| F16K 17/12 | (2006.01) |
| F16K 17/38 | (2006.01) |
| F16K 24/02 | (2006.01) |
| G05D 16/06 | (2006.01) |

(52) U.S. Cl.
CPC .............. *F16K 17/40* (2013.01); *F16K 17/12* (2013.01); *F16K 17/383* (2013.01); *F16K 24/02* (2013.01); *G05D 16/0655* (2013.01)

(58) Field of Classification Search
CPC ........ F16K 17/40; F16K 17/12; F16K 17/383; F16K 24/02; G05D 16/0655; Y10T 137/1774; Y10T 137/1797; Y10T 137/1819; Y10T 137/7724; Y10T 137/1963; Y10T 137/7825
See application file for complete search history.

(56) References Cited

U.S. PATENT DOCUMENTS

| 2,144,125 A | * | 1/1939 | Ryan ..................... F16K 17/383 |
| | | | 137/77 |
| 2,359,111 A | | 9/1944 | Hughes |
| 2,871,879 A | | 2/1959 | Downe et al. |
| 2,902,048 A | * | 9/1959 | Ryan, Jr. .................. F16K 7/17 |
| | | | 137/510 |

(Continued)

OTHER PUBLICATIONS

Italian Search Report dated Oct. 13, 2015, issued in Italian Application No. VI2015A000016, filed Jan. 21, 2015.

*Primary Examiner* — Jessica Cahill
(74) *Attorney, Agent, or Firm* — Workman Nydegger

(57) ABSTRACT

The invention is a gas vent valve (10) for a gas pressure regulator (1), comprising: a tubular body (11) developed between two opposite openings (11*a*, 11*b*); a shutter body (12) biased towards a position in which a first opening (11*a*) of the tubular body (11) is closed and movable from the closed position towards an open position for opening the first opening (11*a*) due to the effect of a pressure acting from the outside of the tubular body (11) through the first opening (11*a*); constraining means (13) configured so as to prevent the movement of the shutter body (12) from the closed position towards the open position when the ambient temperature exceeds a predefined value.

13 Claims, 2 Drawing Sheets

(56) References Cited

U.S. PATENT DOCUMENTS

| | | | | |
|---|---|---|---|---|
| 3,648,727 A | * | 3/1972 | Huyck | G05D 16/185 |
| | | | | 137/505 |
| 4,099,538 A | * | 7/1978 | Curtis | F16K 17/38 |
| | | | | 137/505.42 |
| 4,457,329 A | | 7/1984 | Werley et al. | |
| 4,619,434 A | * | 10/1986 | Snyder | F16K 17/383 |
| | | | | 137/72 |
| 4,974,623 A | * | 12/1990 | Sturgis | F16K 17/40 |
| | | | | 137/74 |
| 5,107,887 A | * | 4/1992 | White | G05D 16/0655 |
| | | | | 137/505.42 |
| 2003/0217770 A1 | * | 11/2003 | Schultz | F16K 17/383 |
| | | | | 137/73 |
| 2005/0067011 A1 | * | 3/2005 | Linden | A62C 2/04 |
| | | | | 137/79 |

* cited by examiner

VENT VALVE FOR GAS PRESSURE REGULATORS AND PRESSURE REGULATOR EQUIPPED WITH SAID VENT VALVE

CROSS-REFERENCE TO RELATED APPLICATIONS

This application claims priority to Italian Application No. VI2015A000016, filed Jan. 21, 2015, which is incorporated herein by specific reference.

BACKGROUND OF THE INVENTION

1. The Field of the Invention

The present invention concerns a vent valve for gas pressure regulators of the type used for the distribution of natural gas. The present invention concerns also a pressure regulator using said vent valve.

2. Relevant Technology

As is known, in the distribution of natural gas, pressure regulators are used to maintain the pressure of the delivered gas at a substantially constant value, independently of the flow rate drawn by the users.

A regulator of the above mentioned type typically comprises a containment body defining a gas flow duct, along which a movable shutter is arranged.

The containment body defines also a motorization chamber containing a membrane that divides the volume of the chamber in a first zone under the same pressure as the gas in the flow duct downstream of the shutter, and in a second zone that is under atmospheric pressure thanks to the presence of a vent hole.

Said vent hole ensures that the membrane can move freely due only to the effect of the variations in the gas pressure at the outlet of the regulator.

The membrane is associated with a preload spring that determines the delivery pressure of the regulator.

The membrane is associated with the shutter in such a way as to transfer its movements to the latter, so that the shutter increases or decreases its degree of opening depending on demand by the users.

The vent hole has a sufficiently limited cross section for the passage of the gas, in order to prevent the membrane from oscillating in the presence of sudden variations in the flow rate of the delivered gas, as a consequence of the so-called "pumping" effect, which would make the operation of the regulator unstable.

Said limited cross section of the vent hole, however, poses the drawback that it prevents any rapid movements of the membrane, which would be necessary in case of important flow rate variations, for example those caused by the start or the stop of a heating boiler.

The drawback described above can be overcome by providing the pressure regulator with a vent valve arranged in parallel with said vent hole, normally closed and configured so that it opens when the pressure in the second zone of the motorization chamber exceeds a predefined value due to a wide and rapid movement of the membrane.

Said vent valve, however, poses the drawback that it allows the gas to flow out of the regulator in case of breakage of the membrane, which can represent a risk in terms of safety, especially when the regulator is exposed to high temperatures.

It is known that in order to overcome said drawback the regulator is provided with a second safety membrane.

However, the technique just described above is not effective in the presence of temperatures that are such as to cause both membranes to collapse.

It is known that in order to overcome said drawback a vent duct is used for the purpose of placing the outlet of the vent means in communication with a zone in which a possible release of gas in the atmosphere would not generate safety risks.

The known technique just described above, however, poses the drawback of being expensive to implement, considered that it requires an additional vent duct that, among other things, can be considerably long.

A further drawback posed by the above mentioned technique lies in that the presence of the vent duct involves a pressure drop that may affect the correct operation of the vent valve.

According to a known technique that represents an alternative to the one previously described, a pressure regulator is used that is oversized compared to the needs and is provided with a membrane whose dimensions are such that the maximum gas pressure variation allowable during operation causes just a small movement of the membrane, which can be managed by means of the vent hole only, with no need to provide also a vent valve.

Also this second known technique, however, poses the drawback of being rather expensive, due to the higher cost of the oversized pressure regulator.

SUMMARY OF THE INVENTION

The present invention intends to overcome all the said drawbacks related to the known techniques.

In particular, it is the object of the present invention to allow the use of a pressure regulator that is sized according to the flow rate to be delivered and that ensures the same performance levels as an analogous pressure regulator provided with a vent valve, while at the same time limiting the maximum gas flow rate discharged towards the outside of the regulator in the presence of temperatures exceeding a predefined safety threshold.

Said object is achieved by a vent valve constructed in accordance with claim 1.

Said object is also achieved by a pressure regulator constructed in accordance with claim 9.

Further characteristics and details of the invention are provided in the respective dependent claims.

Advantageously, the invention eliminates the need to provide for the presence of a duct that connects the vent valve to a safety zone.

Still advantageously, the invention eliminates the need to use a regulator that is oversized compared to the needs.

Consequently, the invention advantageously makes it possible to limit the costs related to the pressure regulator compared to those related to the known techniques described above, at least in those applications in which it is necessary to limit the flow rate of the gas delivered outside of the regulator in high temperature conditions.

BRIEF DESCRIPTION OF THE DRAWINGS

The said objects and advantages, together with others that will be illustrated here below, are highlighted in the description of a preferred embodiment of the invention, which is provided by way of example without limitation with reference to the attached drawings, wherein.

DETAILED DESCRIPTION OF THE PREFERRED EMBODIMENTS

Figure 1:
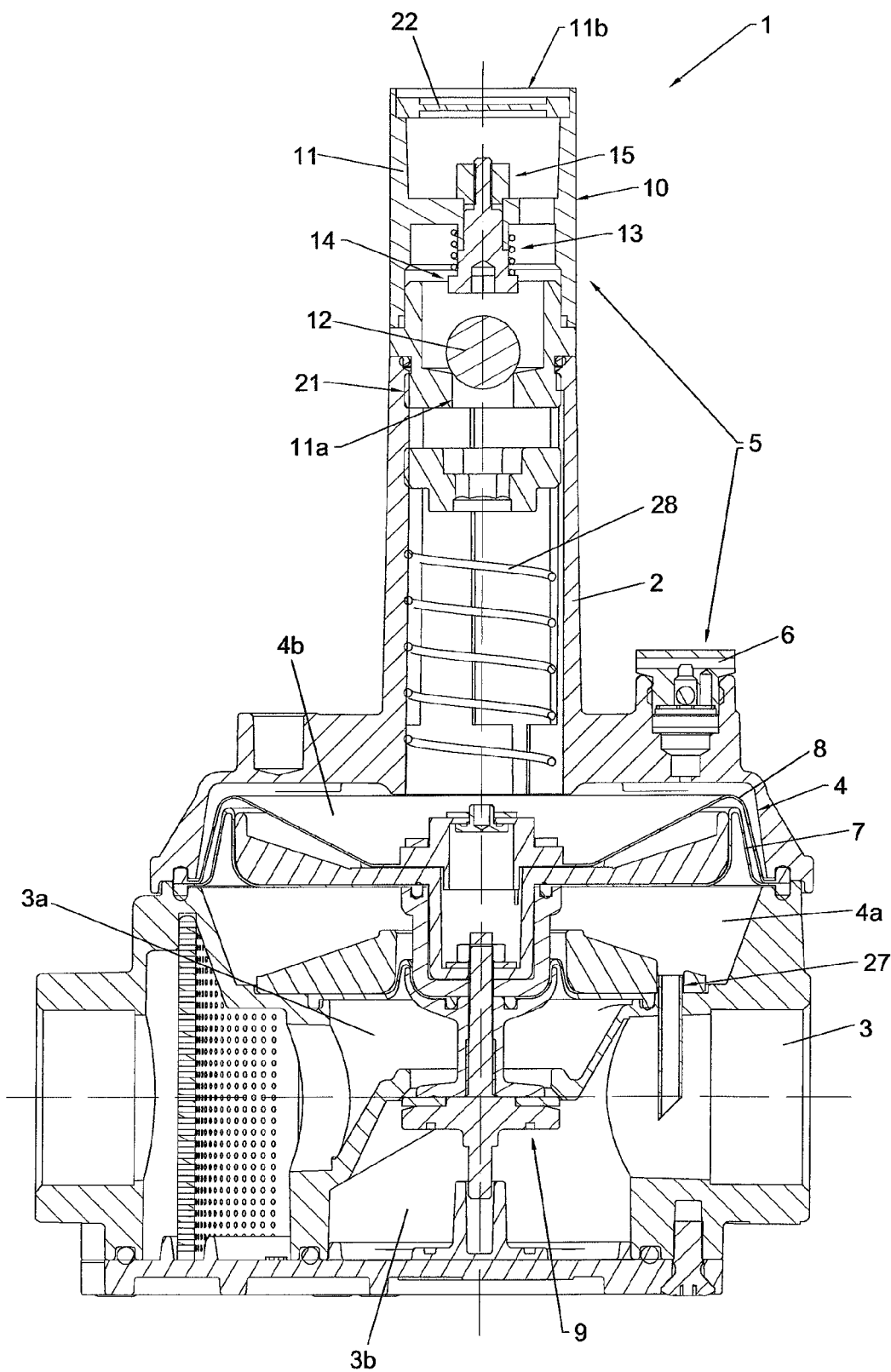
FIG. 1 shows a sectional view of the pressure regulator that is the subject of the invention.

The vent valve that is the subject of the invention will be described with reference to a gas pressure regulator indicated as a whole by the reference number 1 in FIG. 1.

The pressure regulator 1 comprises a containment body 2 that defines a flow duct 3 for said gas and a motorization chamber 4 that communicates with the flow duct 3, for example through a passage hole 27.

The flow duct 3 comprises a section under high pressure 3a, to which the gas supply line is connected, and a section under low pressure 3b, to which the duct conveying the gas to the user device is connected.

A shutter 9 is interposed between said two sections 3a, 3b, creating a bottleneck with adjustable cross section that makes it possible to adjust the gas pressure drop between the two sections.

The shutter 9 is associated with a first membrane 7 arranged in said motorization chamber 4 in such a way as to divide the latter in a first zone 4a, which is placed in communication with the flow duct 3, and a second zone 4b, which communicates with vent means 5 in turn communicating with the outside of the containment body 2.

In particular, the shutter 9 is operatively associated with the first membrane 7 in such a way that the movements of the latter in two opposite directions cause corresponding movements of the shutter 9 that are intended to increase or, respectively, decrease the cross section of the gas passage along the flow duct 3.

In the example illustrated in FIG. 1, lifting the first membrane 7 closes the shutter 9, and vice versa.

The membrane 7 is associated with elastic means 28, typically comprising a spring that counteracts the action of the gas pressure in the second zone 4b of the motorization chamber with a force that is proportional to the gas pressure that the pressure regulator 1 needs to maintain in the low pressure section 3b of the flow duct 3.

As far as the vent means 5 are concerned, these comprise a vent hole 6 that places the second zone 4b of the motorization chamber 4 in permanent communication with the outside of the containment body 2.

Said vent hole 6 makes it possible to constantly maintain the membrane side facing towards the second zone 4b of the motorization chamber 4 under atmospheric pressure, thus allowing the air to be vented out of the second zone 4b according to the variations in the volume of the latter resulting from the movements of the first membrane 7.

Preferably, the vent hole 6 has a reduced cross section for the passage of gas, preferably smaller than 1 mm², in such a way as to limit the maximum gas flow rate that can be let out of the pressure regulator 1 in case of failure of the regulator itself, for example in case of breakage of the first membrane 7.

Preferably, the regulator 1 comprises a second membrane 8 interposed between said first membrane 7 and the vent means 5.

Advantageously, said second membrane 8 makes it possible to preserve the functionality of the regulator 1 also in case of breakage of the first membrane 7, until the replacement of the regulator 1.

Preferably, the second membrane 8 is provided with a hole suited to prevent the formation of an air cushion with the first membrane and having a diameter that is such as to limit the release of gas through the vent hole 6 to a flow rate deemed safe.

Figure 2:
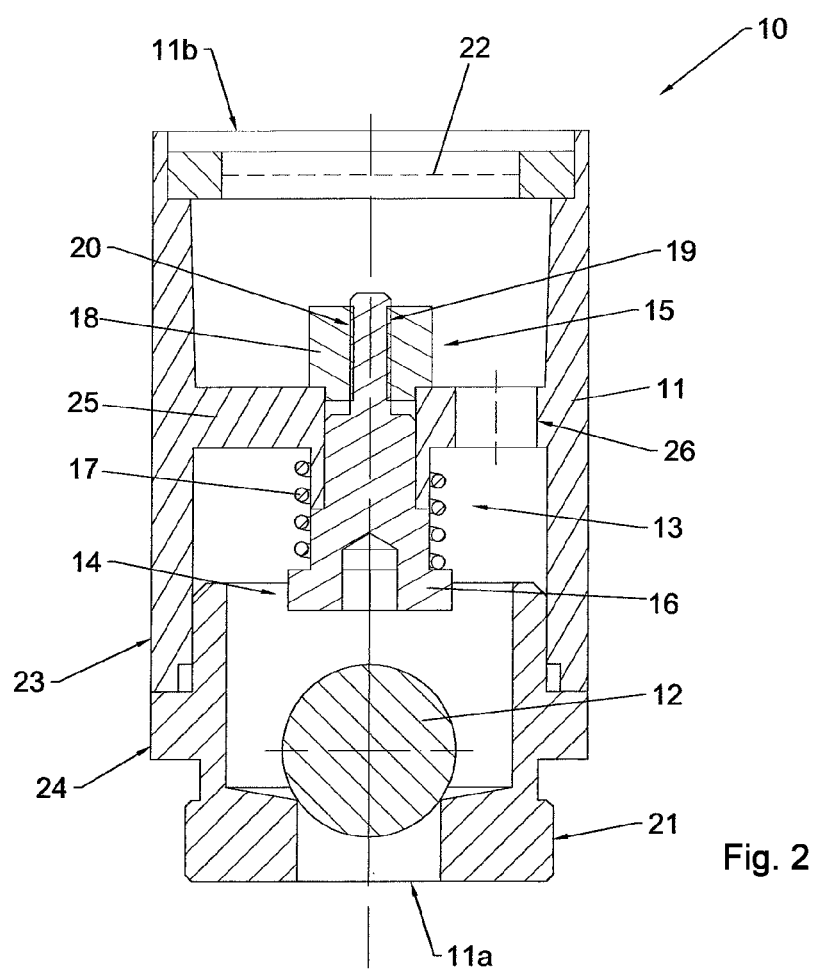
FIG. 2 shows a sectional view of the vent valve that is the subject of the invention.

The vent means 5 comprise also a vent valve 10 that, as shown in greater detail in FIG. 2, comprises a tubular body 11 for the passage of air, provided with two openings 11a, 11b located opposite each other.

The first opening 11a is in communication with the motorization chamber 4 of the pressure regulator 1, while the second opening 11b faces towards the outside of the pressure regulator 1 and is preferably protected by a filter 22 that prevents the penetration of impurities in the valve.

The vent valve 10 comprises also a shutter body 12, configured in such a way that it can spontaneously assume a position in which a first one of said two openings 11a is closed and that it can be moved from the closed position towards an open position of the first opening 11a due to the effect of a pressure acting from the outside of the tubular body 11 through the first opening 11a itself.

Preferably but not necessarily, said shutter body 12 is a ball that, due to the effect of its own weight, spontaneously comes to be positioned at the bottom, so as to close the first opening 11a, but is raised by a sufficient pressure that is exerted through the latter.

Advantageously, said vent valve 10 allows the first membrane 7 of the shutter 9 to perform sudden and relatively large movements in the direction corresponding to the reduction in the volume of the second zone 4b of the motorization chamber 4, upwards in the case at hand.

Said movements are, typically, those corresponding to a sudden reduction in the flow rate of operative gas following a corresponding reduction in demand by the users. Said phenomenon takes place, for example, in the heating boilers when they are switched off.

In particular, an interruption in the demand by the users causes a pressure impulse in the second section 3b of the flow duct 3 of the regulator 1 which causes the development, on the first membrane 7, of a corresponding pressure that tends to move it in the direction corresponding to the reduction in the volume of the second zone 4b of the motorization chamber 4, consequently producing an overpressure therein.

This last overpressure lifts the shutter body 12 of the vent valve 10, thus allowing the excess air to flow towards the outside of the motorization chamber 4 so that the air itself does not hinder the rapid upward movement of the first membrane 7.

When the first membrane 7 is going to reach the new balance position, in which the pressure in the second zone 4b counterbalances the force of the spring 28, said overpressure is reduced to such a level that the shutter body 12 spontaneously closes the first opening 11a. In this condition, the passage of air between the second zone 4b and the outside takes place only through the vent hole 6 whose reduced cross section, considerably smaller than the gas passage cross section of the vent valve 10 in the open configuration, prevents the triggering of the pumping effect described above.

According to the invention, the vent valve 10 comprises constraining means 13 configured to prevent the movement of the shutter body 12 from the closed position towards the open position when the ambient temperature exceeds a predefined value.

In case of breakage of the first membrane 7 and, if present, of the second membrane 8 of the pressure regulator 1 in high temperature conditions, said constraining means 13 prevent the vent valve 10 from allowing the release of a high gas flow rate towards the outside, with potentially dangerous consequences.

In fact, when the temperature reaches said predefined value, the vent valve 10 is inhibited and any gas leakages must necessarily pass through the vent hole 6, which limits their flow rate to levels that are not deemed dangerous.

Preferably, said predefined value is lower than 150° C. and, even more preferably, it is included between 110° C. and 130° C.

Still preferably, the second membrane 8 of the regulator 1 or, if this is absent, the first membrane 7, is made in such a way that it resists a temperature exceeding the predefined collapse value.

In this way, advantageously, leakages from the regulator 1 at a high gas flow rate will be avoided in the case where the membranes 7, 8 should collapse due to an excessive temperature.

In fact, when the temperature that causes the collapse of the membranes 7, 8 is reached, the constraining means 13 have already intervened and the vent valve 10 is therefore already blocked.

Preferably and as shown in detail in FIG. 2, the constraining means 13 comprise thrust means 14 suited to maintain the shutter body 12 in the closed position, and stop means 15 suited to inhibit the thrust means 14 and configured so as to release the latter when the ambient temperature exceeds said predefined value.

Preferably, the thrust means 14 comprise a shaped body 16 associated with elastic means 17 suited to thrust it against the shutter body 12 so as to force it in the closed position.

As far as the stop means 15 are concerned, these preferably comprise a counteracting body 18 constrained to the tubular body 11 and suited to counteract the action of the elastic means 17 in order to maintain the shaped body 16 in a spaced position with respect to the shutter body 12 and configured so that it yields when the ambient temperature exceeds the predefined value.

Advantageously, said configuration makes it possible to produce a vent valve 10 that is effective, reliable and simple to manufacture.

Figure 3:
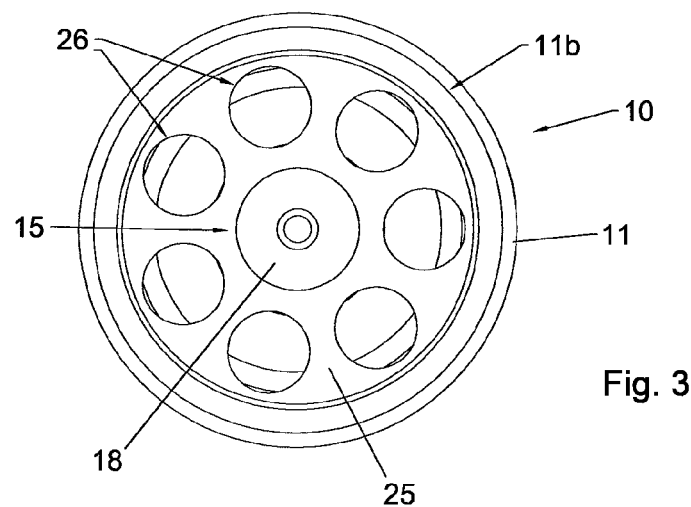
FIG. 3 shows a top view of the valve shown in FIG. 2.

Preferably, the counteracting body 18 rests on a reference partition 25 belonging to the tubular body 11 and comprising one or more holes 26 for the passage of air, visible in FIG. 3 which, for the sake of clarity, shows the vent valve 10 without the filter 22.

Preferably, the counteracting body 18 is associated with the shaped body 16 through a counter thread 20 screwed to a corresponding thread 19 belonging to the shaped body 16.

Advantageously, the configuration just described above facilitates the assembly of the vent valve 10 and simplifies its construction.

Regarding the elastic means 17, these preferably comprise a spring.

Regarding, on the other hand, the counteracting body 18, this is preferably made of a plastic material, even more preferably an acetal-based or nylon-based material, filled so as to provide it with the desired heat resistance characteristics.

Preferably, the tubular body 11 of the vent valve 10 comprises an external thread 21 suited to be screwed into a threaded hole provided in the pressure regulator 1.

Advantageously, said external thread 21 allows the vent valve 10 to be coupled with most pressure regulators 1, exploiting the threaded inspection hole with which most of the regulators available on the market are provided.

Preferably but not necessarily, the tubular body 11 is constituted by two distinct portions 23, 24, wherein one of the two portions 24 comprises the external thread 21.

Advantageously, the structure of the tubular body 11 divided in two portions as described above facilitates the coupling of the vent valve 10 with various pressure regulators 1 that differ from one another for the thread provided in the hole housing the vent valve 10.

In fact, the portion 24 of the tubular body 11 can be made in several variants, all of which can be coupled with the portion 23 of the tubular body 11, but each one of which is provided with a corresponding external thread 21 that is different from the external thread of the other variants.

In the light of the description provided above, it can be understood that the vent valve and the pressure regulator equipped with said valve achieve the set object.

In fact, the vent valve allows the rapid movement of the membrane of the regulator in the presence of considerable and rapid variations in the required gas flow rate, at the same time preventing the outflow of gas in temperature conditions deemed unsafe but avoiding the need to use a vent duct to convey the gas from the valve to a safe area, or an oversized regulator, thus making it possible to limit costs.

The invention claimed is:

1. A gas vent valve for a gas pressure regulator, comprising:
   a tubular body provided with a first opening and a second opening opposite thereof;
   a shutter body movably mounted to move between a closed position, in which said shutter body closes said first one opening, and an open position, in which said shutter body opens said first opening, said shutter body being constantly biased towards said closed position, said shutter body being biased towards said open position upon a pressure acting from the outside of said tubular body through said first opening,
   wherein said second opening is in communication with said first opening so that, when a gas coming from said first opening opens said shutter body, said gas flows through said second opening; and
   further comprising constraining means for preventing said shutter body from moving from said closed position towards said open position when the ambient temperature exceeds a predefined value, said constraining means comprising:
   thrust means at least partially disposed within said tubular body and suited for maintaining said shutter body in said closed position, said thrust means being disposed between said first opening and said second opening; and
   stop means suited for inhibiting said thrust means, said stop means being configured so as to release said thrust means when the ambient temperature exceeds said predefined value.

2. The gas vent valve according to claim 1, wherein said thrust means comprise a shaped body associated with elastic means suited for thrusting said shaped body against said shutter body, said stop means comprising a counteracting body constrained to said tubular body and suited to maintain said shaped body in a spaced position with respect to said shutter body against the action of said elastic means, said counteracting body being configured to yield when the ambient temperature exceeds said predefined value.

3. The gas vent valve according to claim 2, wherein said shaped body comprises a thread, said counteracting body comprising a counter thread screwed to said thread.

4. The gas vent valve according to claim 2, wherein said elastic means comprise a spring.

5. The gas vent valve according to claim 2, wherein said counteracting body is made of a plastic material.

6. The gas vent valve according to claim 5, wherein said plastic material is a acetal-based or nylon-based material.

7. The gas vent valve according to claim 1, wherein said tubular body comprises an external thread so that said tubular body can be screwed to a pressure regulator.

8. A gas pressure regulator comprising:
a containment body that defines a flow duct for a gas and a motorization chamber communicating with said flow duct;
vent means suited for placing said motorization chamber in communication with the outside of said containment body and comprising a vent hole suited to place said motorization chamber in permanent communication with the outside of said containment body;
a first membrane arranged in said motorization chamber in such a way as to divide said motorization chamber into a first zone, communicating with said flow duct, and into a second zone, communicating with said vent means;
a shutter arranged in said flow duct and associated with said first membrane in such a way that the movements of said first membrane in two opposite directions cause corresponding movements of said shutter intended to increase or, respectively, decrease a gas passage cross section along said flow duct, wherein said gas vent means comprise a vent valve according to claim 1.

9. The regulator according to claim 8, wherein said vent hole has a smaller gas passage cross section compared to that of said vent valve.

10. The regulator according to claim 8, further comprising a second membrane interposed between said first membrane and said vent means and being configured so as to resist a temperature exceeding said predefined value.

11. The gas vent valve according to claim 1, further comprising a gas pressure regulator secured to the tubular body.

12. A gas pressure regulator comprising:
a containment body having an inlet, an outlet, and a flow duct that extends therebetween, the containment body also having a motorization chamber;
a first membrane disposed within the containment body and dividing the motorization chamber into a first zone that communicates with the flow duct and a second zone;
a shutter disposed in the flow duct and associated with the first membrane so that movement of the first membrane in two opposite directions causes corresponding movement of the shutter; and
a first gas vent valve comprising:
a tubular body having a first opening and a second opening spaced apart from the first opening, the tubular body being secured to the containment body so that the first opening is in communication with the second zone of the motorization chamber;
a shutter body movable between a first position wherein the shutter body closes the first opening and a second position wherein the shutter body opens the first opening, the shutter body being resiliently biased towards the closed position, the first opening being in communication with the second opening when the shutter body is in the second position; and
a constraining member that prevents the shutter body from moving from the first position toward the second position when the ambient temperature exceeds a predefined value, the constraining member comprising:
a thrust member at least partially disposed within the tubular body and suited for maintaining the shutter body in the closed position, the thrust member being disposed between the first opening and the second opening;
a stop member that inhibits movement of the thrust member, the stop member releasing the thrust member when the ambient temperature exceeds the predefined value; and
a spring that moves the thrust member when the thrust member is released by the stop member, the spring forcing the thrust member against the shutter body so as to hold the shutter body in the first position.

13. The gas pressure regulator according to claim 12, further comprising a second vent valve spaced apart from the first vent valve, the second vent valve being in communication with the second zone of the motorization chamber.

* * * * *